US006385564B1

(12) United States Patent
Brown et al.

(10) Patent No.: US 6,385,564 B1
(45) Date of Patent: May 7, 2002

(54) MEASURING SYSTEM REPEATABLE BANDWIDTH FOR SIMULATION TESTING

(75) Inventors: Roger G. Brown, Watertown; Douglas S. Mann, Shorewood; Richard A. Lund, Chaska, all of MN (US)

(73) Assignee: MTS Systems Corporation, Eden Prairie, MN (US)

( * ) Notice: Subject to any disclaimer, the term of this patent is extended or adjusted under 35 U.S.C. 154(b) by 0 days.

(21) Appl. No.: 09/439,169

(22) Filed: Nov. 12, 1999

Related U.S. Application Data

(60) Provisional application No. 60/108,295, filed on Nov. 13, 1998.

(51) Int. Cl.$^7$ ............................ G06B 17/00; G01M 7/00
(52) U.S. Cl. ................................ 703/7; 703/2; 73/778; 73/577
(58) Field of Search .................. 703/1, 2, 7, 8, 703/6; 702/33, 39, 56; 73/577, 778

(56) References Cited

U.S. PATENT DOCUMENTS

| | | | |
|---|---|---|---|
| 3,855,841 A | | 12/1974 | Hunter .................... 73/11.08 |
| 4,061,017 A | * | 12/1977 | Sloane et al. ................. 73/579 |
| 4,480,480 A | * | 11/1984 | Scott et al. .................... 73/769 |
| 4,513,622 A | | 4/1985 | Uretsky ........................ 73/664 |
| 4,916,632 A | | 4/1990 | Doi et al. ..................... 700/280 |
| 4,989,158 A | | 1/1991 | Sloane ......................... 700/280 |
| 5,175,678 A | | 12/1992 | Frerichs et al. ............... 700/47 |
| 5,209,661 A | * | 5/1993 | Hildreth et al. ............... 434/45 |
| 5,353,207 A | | 10/1994 | Keeler et al. ................. 700/44 |
| 5,377,307 A | | 12/1994 | Hoskins et al. ............... 706/19 |
| 5,568,404 A | * | 10/1996 | Strumolo .................... 702/140 |
| 5,572,440 A | * | 11/1996 | Harashima et al. ......... 700/280 |
| 5,598,329 A | | 1/1997 | Niemann ..................... 700/30 |
| 5,649,063 A | | 7/1997 | Bose ........................... 706/23 |
| 5,729,463 A | * | 3/1998 | Koenig et al. ............... 700/98 |
| 5,901,072 A | * | 5/1999 | Shimmell ..................... 703/7 |
| 5,949,989 A | * | 9/1999 | Falkowski et al. ............ 703/8 |

FOREIGN PATENT DOCUMENTS

| WO | WO 85/03547 | 8/1985 |
|---|---|---|
| WO | WO 97/42553 | 11/1997 |

OTHER PUBLICATIONS

B. W. Cryer et al., "A Road Simulation System for Heavy Duty Vehicles", Society of Automotive Engineers, Automotive Engineering Congress and Exposition, Detroit, Michigan, Feb. 23–17, 1976, pp. 1–13.

MTS Brochure: "Explaining the Six Steps of Remote Parameter Control™", MTS Systems Corporation, May 1996, pp. 1–11.

J. B. Craig, "ITFC—How it works and where to use it", Carl Schenck AG, Sep. 1979, pp. 1–61.

(List continued on next page.)

*Primary Examiner*—Kyle Choi
(74) *Attorney, Agent, or Firm*—Westman, Champlin & Kelly, P.A.

(57) ABSTRACT

A system and method for identifying characteristics of a physical system applies substantially identical drive ensembles to the physical system and obtains corresponding responses from the physical system. A repeatable bandwidth of the physical system is estimated as a function of the applied drive ensembles and the corresponding obtained responses. Instructions can be provided on a computer readable medium to perform the method.

24 Claims, 6 Drawing Sheets

OTHER PUBLICATIONS

Jürgen Petersen et al., SAE Technical Paper Series—The Conception, Description, and Application of a New Vehicle Endurance Test System at AUDI NS, International Congress and Exposition, Detroit, Michigan Feb. 22–26, 1982, pp. 1–13.

Ian Cook, "Appendix A—User Presentations: How to Get a Drive File—Jaguar Cars", RPC User Group, 8th RPC User Group Meeting, Nov. 9–10, 1988, Eindhoven, the Netherlands, pp. 1–51.

Schenck Brochure: "ITFC Computer Control—the modern approach to Automated–Multiple–Input Simulation Testing" Carl Schenck AG, prior to Jan. 22, 1998.

Phil Grote and Glen Grenier, "Taking the Test Track to the Lab" Automotive Engineers, Jun. 1987, vol. 95, No. 6, pp. 61–64.

Richard A. Lund, "Multiple Channel Environmental Simulation Techniques" MTS Systems Corporation, Oct. 1–2, 1979, pp. 1–20.

"RPC–II Software, Section RPC—Introduction to RPC–II" MTS Systems Corporation, 1987.

"RPC–II Software, Section FRF—Frequency Response Function" MTS Systems Corporation, 1988.

"RPC–11 Software, Section THI—Time History Iteration" MTS Systems Corporation, 1988.

"RPC–11 Software, Spectral Density Iteration", for MTS Systems Corporation, 1987.

"RPC–II, Section FDB—Frequency Domain Baseline", MTS Systems Corporation, 1987.

Jeffrey N. Fletcher, "Global Simulation: A New Technique for Multiaxis Test Control", 1990 Proceedings—Institute of Environmental Sciences, pp. 147–156.

Iain G. McGregor, "Use of the Iterative De–Convolution Method for Vehicle Stimulations", Automotive technology and automation: 20th International Symposium, May 1989, Florence, Italy, pp. 889–905.

Richard A. Lund, "Advances In Multiple–Channel Environmental Simulation Techniques", Seminar on Modernization in Automotive Technology, Automotive Research Association of India, Pune, India, Dec. 16–17, 1983.

Wolpert et al., "Multiple paired forward and inverse models for motor control", Neutral Networks, vol. 11, No. 7/08, Oct. 1, 1998, pp. 1317–1329.

\* cited by examiner

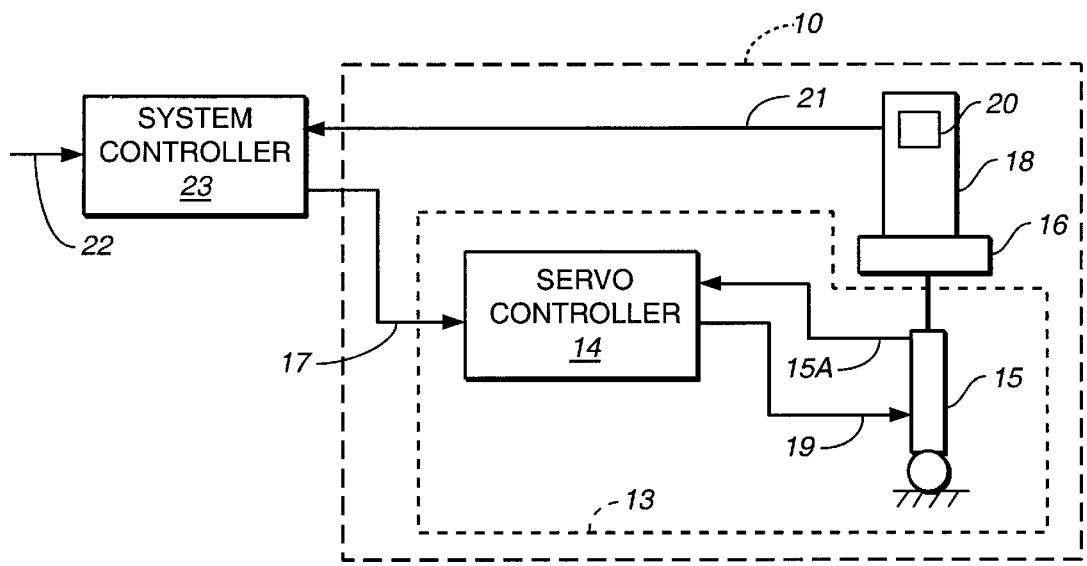
FIG._1
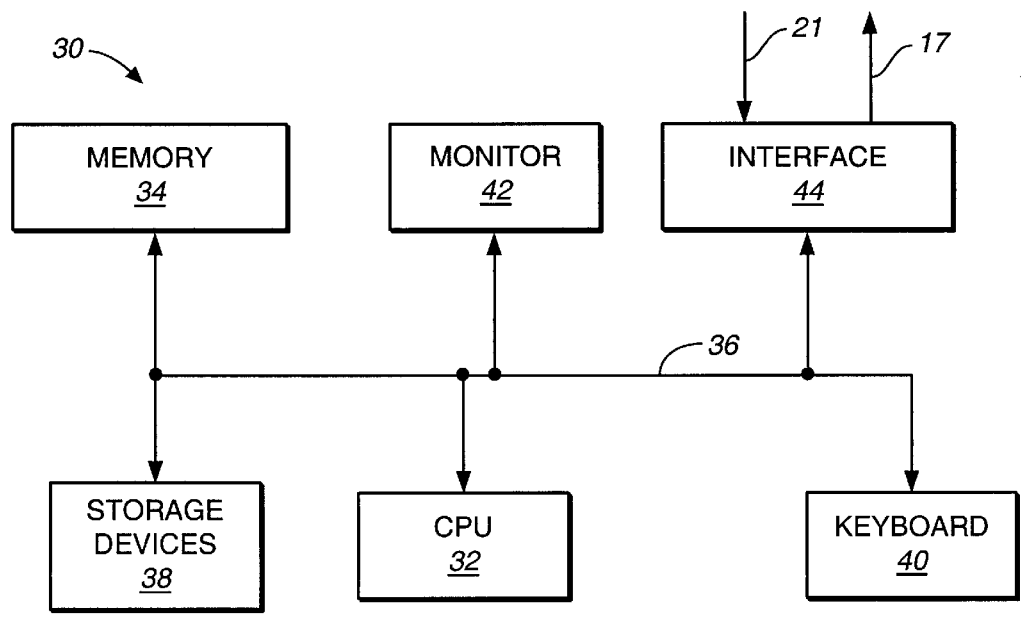
FIG._2

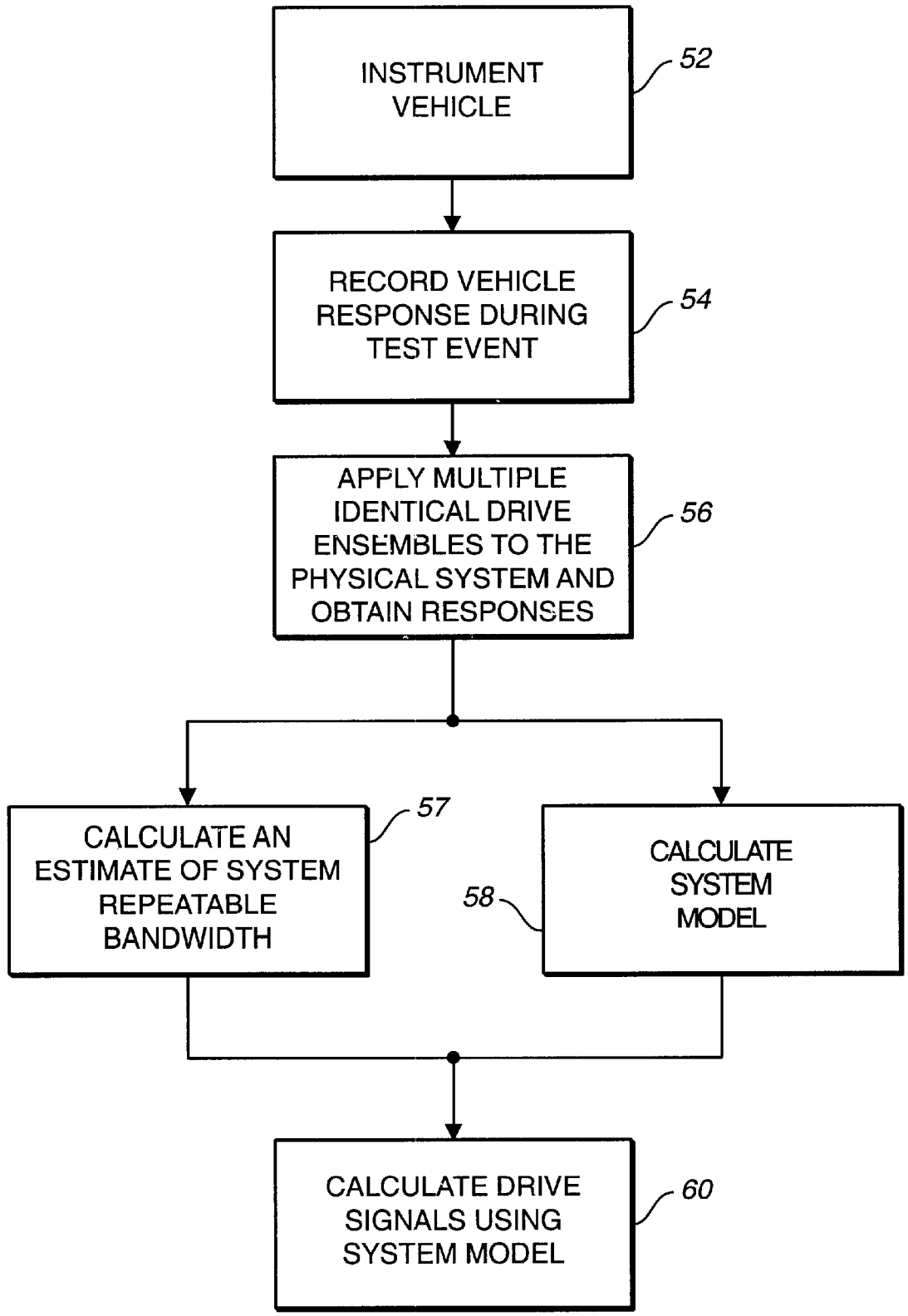
FIG._3

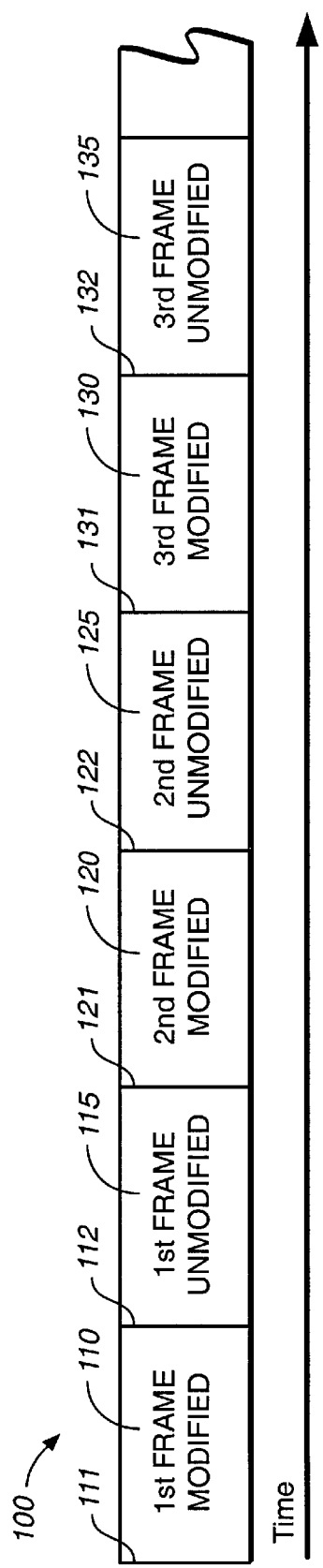
FIG._4 (PRIOR ART)
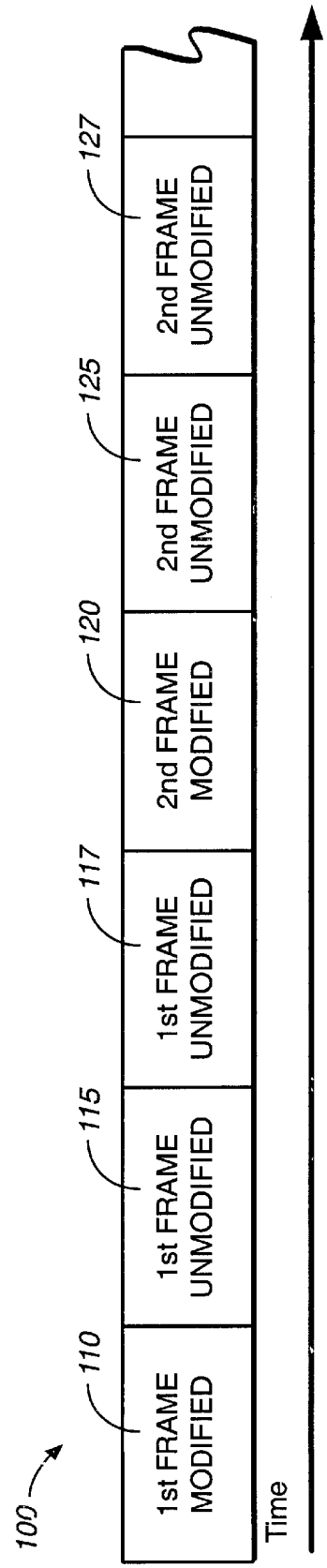
FIG._5

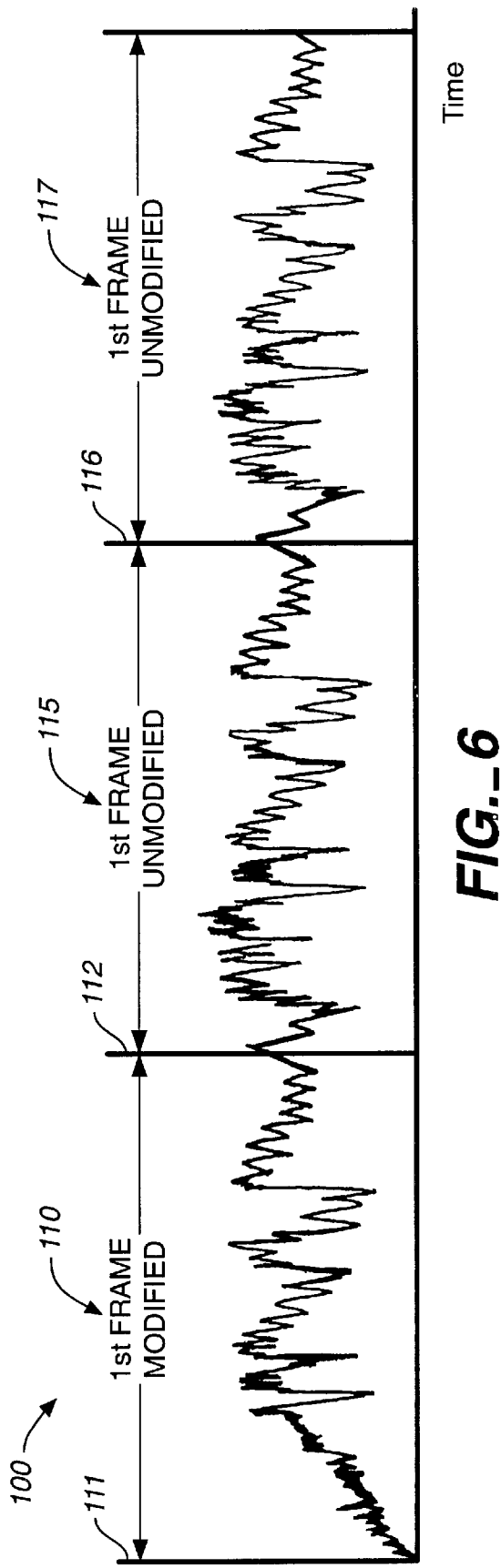
FIG._6
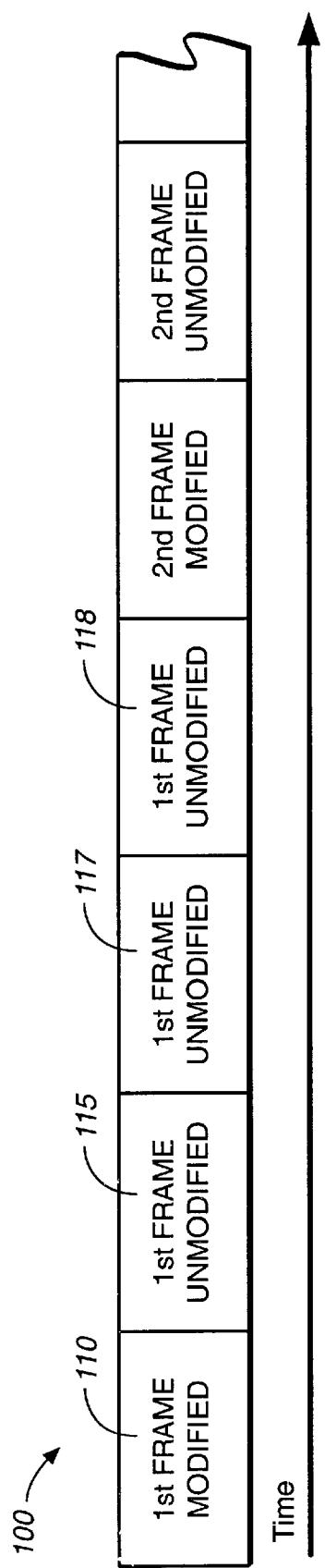
FIG._7

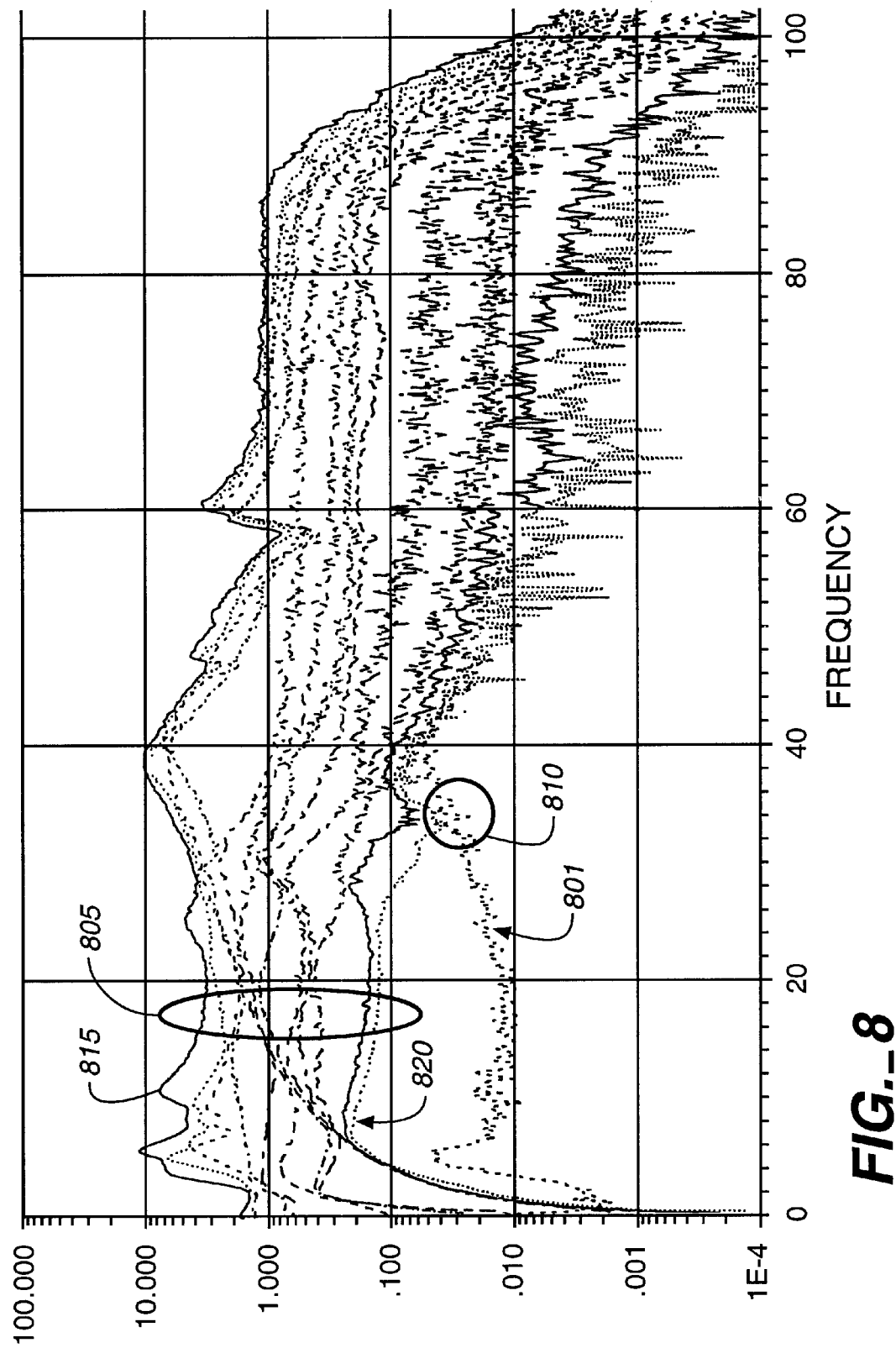
FIG._8

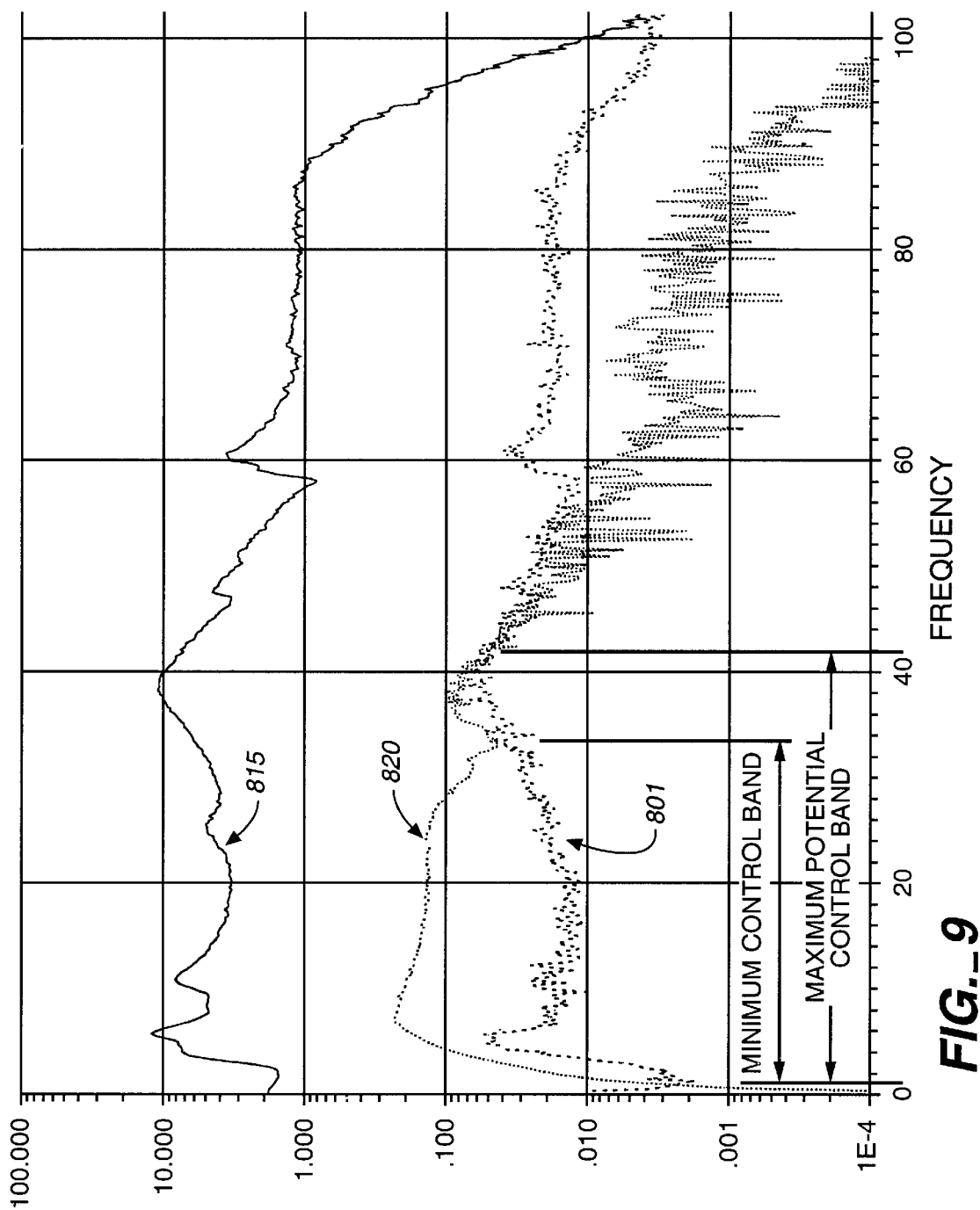
FIG._9

MEASURING SYSTEM REPEATABLE BANDWIDTH FOR SIMULATION TESTING

CROSS-REFERENCE TO RELATED APPLICATION

This application is based on and claims priority of U.S. provisional patent application serial No. 60/108,295 filed Nov. 13, 1998, the content of which is hereby incorporated by reference in its entirety. Co-pending and commonly assigned U.S. patent application Ser. No. 09/234,998 filed Jan. 21, 1999 is also incorporated by reference in their entirety.

BACKGROUND OF THE INVENTION

The present invention relates to control of a system, machine or process that is repetitive in nature or is amenable to at least some degree of rehearsal. More particularly, the present invention relates to determining a repeatable control bandwidth of a vibration system, to or within a metric appropriate for the application.

Vibration systems that are capable of simulating loads and/or motions applied to test specimens are generally known. Vibration systems are widely used for performance evaluation, durability tests, and various other purposes as they are highly effective in the development of products. For instance, it is quite common in the development of automobiles, motorcycles, or the like, to subject the vehicle or a substructure thereof to a laboratory environment that simulates operating environments such as a road or test track. Physical simulation in the laboratory involves a well-known method of data acquisition and analysis in order to develop drive signals that can be applied to the vibration system to reproduce the operating environment. This method includes instrumenting the vehicle with transducers "remote" to the physical inputs of the operating environment. Common remote transducers include, but are not limited to, strain gauges, accelerometers, and displacement sensors, which implicitly define the operating environment of interest. The vehicle is then driven in the same operating environment, while remote transducer responses (internal loads and/or motions) are recorded to represent the "desired" response for the simulation. During simulation with the vehicle mounted to the vibration system, actuators of the vibration system are driven so as to reproduce the recorded remote transducer responses on the vehicle in the laboratory thereby replicating the desired response.

However, before simulated testing can occur, the relationship between the input drive signals to the vibration system and the responses of the remote transducers must be characterized in the laboratory. Typically, this "system identification" procedure involves obtaining a respective system model or transfer function of the complete physical system (e.g. vibration system, test specimen, and remote transducers) hereinafter referred to as the "physical system". The inverse of the system model is used to iteratively obtain suitable drive signals for the vibration system to achieve substantially the same response from the remote transducers on the test specimen in the laboratory situation as was found in the operating environment. The iterative process can involve, for example, various methods of adjusting the drive signals iteratively until the response achieved from the physical system is acceptably close to the desired response.

As those skilled in the art would appreciate, this process of obtaining suitable drive signals is not altered when the remote transducers are not physically remote from the test system inputs (e.g. the case where "remote" transducers are the feedback variables, such as force or motion, of the vibration system controller).

Although the above-described system and method for obtaining drive signals for a vibration system has enjoyed substantial success, there is a continuing need to improve such systems. For example, a fundamental limitation on the accuracy with which the desired operating responses can be reproduced in the simulation test is the repeatability of the response of the physical system, as measured by the remote transducers, to the same input drive signal (repeated). Frequently, physical systems are only repeatably controllable to within an appropriate metric of accuracy over a limited frequency range. This limited frequency range, referred to herein as a "repeatable bandwidth", is the frequency range over which the system can be controlled with some desired or necessary measure of repeatability. While the physical system will generally be controllable over larger frequency ranges, physical system characteristics result in repeatability exceeding the desired metric outside of the repeatable bandwidth. As discussed, one of the primary difficulties in performing laboratory simulation is to determine the frequency range over which the simulation may be expected to be repeatably accurate. A common method of predicting a simulation range is to use ordinary, partial and multiple coherences whose results often do not correlate with the results obtained during the iterative process. Moreover, coherence measurements frequently do not provide any recourse for improving the simulation bandwidth.

Commonly, when developing drive signals for the physical system, an assumption is made that the system will be used, and is repeatably controllable, over a particular frequency range. Considerable effort may be expended trying to achieve a drive signal that accurately reproduces the desired response over a frequency range that in fact may not be possible. Consequently, there is a need to accurately estimate the repeatable bandwidth of the physical system prior to modeling and/or iteratively obtaining drive signals during the system identification phase.

SUMMARY OF THE INVENTION

A system and method for identifying characteristics of a physical system applies substantially identical drive ensembles to the physical system and obtains corresponding responses from the physical system. A repeatable bandwidth of the physical system is estimated as a function of the applied drive ensembles and the corresponding obtained responses. Instructions can be provided on a computer readable medium to perform the method.

BRIEF DESCRIPTION OF THE DRAWINGS

FIG. 1 is a block diagram of an exemplary environment for practicing the present invention.

FIG. 2 is a computer for implementing the present invention.

FIG. 3 is a flow chart illustrating steps involved in an identification phase of a method of vibration testing.

FIG. 4 is a diagrammatic illustration of a prior art technique for generating frames of a test drive signal.

FIGS. 5 and 6 are diagrammatic illustrations of a first technique for generating frames of a test drive signal in accordance some embodiments of the present invention.

FIG. 7 is a diagrammatic illustration of a second technique for generating frames of a test drive signal in accordance some embodiments of the present invention.

FIGS. 8 and 9 are plots illustrating an aspect of calculating physical system repeatable bandwidth in accordance with the present invention.

DETAILED DESCRIPTION OF THE PREFERRED EMBODIMENTS

FIG. 1 illustrates a physical system 10. The physical system 10 generally includes a vibration system 13 comprising a servo controller 14 and an actuator 15. In the schematic illustration of FIG. 1, the actuator 15 represents one or more actuators that are coupled through a suitable mechanical interface 16 to a test specimen 18. The servo controller 14 provides an actuator command signal 19 to the actuator 15, which in turn, excites the test specimen 18. Suitable feedback 15A is provided from the actuator 15 to the servo controller 14. One or more remote transducers 20 on the test specimen 18, such as displacement sensors, strain gauges, accelerometers, or the like, provide a measured or actual response 21.

A physical system controller 23 receives the actual response 21 as feedback to compute a drive 17 as input to the physical system 10. In an embodiment in which the drive 17 is generated using an iterative process, the physical system controller 23 generates the drive 17 for the physical system 10 based on the comparison of a desired response provided at 22 and the actual response 21 of the remote transducer 20 on the test specimen 18. Although illustrated in FIG. 1 for the single channel case, multiple channel embodiments with response 21 comprising N response components and the drive 17 comprising M drive components are typical and considered another embodiment of the present invention.

Although described herein where the physical system comprises the vibration system 13 and remote transducer 20, aspects of the present invention described below can be applied to other physical systems. For instance, in a manufacturing process, the physical system includes the manufacturing machines (e.g. presses, molding apparatus, forming machines, etc.) and the drive 17 provides command signals to said machines, and the actual response 21 comprises manual or automatic measured parameters of the manufactured article such as a critical dimension.

FIG. 2 and the related discussion provide a brief, general description of a suitable computing environment in which the invention may be implemented. Although not required, the physical system controller 23 will be described, at least in part, in the general context of computer-executable instructions, such as program modules, being executed by a computer 30. Generally, program modules include routine programs, objects, components, data structures, etc., which perform particular tasks or implement particular abstract data types. The program modules are illustrated below using block diagrams and flowcharts. Those skilled in the art can implement the block diagrams and flowcharts to computer-executable instructions. Moreover, those skilled in the art will appreciate that the invention may be practiced with other computer system configurations, including multi-processor systems, networked personal computers, mini computers, main frame computers, and the like. The invention may also be practiced in distributed computing environments where tasks are performed by remote processing devices that are linked through a communications network. In a distributed computer environment, program modules may be located in both local and remote memory storage devices.

The computer 30 illustrated in FIG. 2 comprises a conventional personal or desktop computer having a central processing unit (CPU) 32, memory 34 and a system bus 36, which couples various system components, including the memory 34 to the CPU 32. The system bus 36 may be any of several types of bus structures including a memory bus or a memory controller, a peripheral bus, and a local bus using any of a variety of bus architectures. The memory 34 includes read only memory (ROM) and random access memory (RAM). A basic input/output (BIOS) containing the basic routine that helps to transfer information between elements within the computer 30, such as during start-up, is stored in ROM. Storage devices 38, such as a hard disk, a floppy disk drive, an optical disk drive, etc., are coupled to the system bus 36 and are used for storage of programs and data. It should be appreciated by those skilled in the art that other types of computer readable media that are accessible by a computer, such as magnetic cassettes, flash memory cards, digital video disks, random access memories, read only memories, and the like, may also be used as storage devices. Commonly, programs are loaded into memory 34 from at least one of the storage devices 38 with or without accompanying data.

An input device 40 such as a keyboard, pointing device (mouse), or the like, allows the user to provide commands to the computer 30. A monitor 42 or other type of output device is further connected to the system bus 36 via a suitable interface and provides feedback to the user. The desired response 22 can be provided as an input to the computer 30 through a communications link, such as a modem, or through the removable media of the storage devices 38. The drive signals 17 are provided to the physical system 10 of FIG. 1 based on program modules executed by the computer 30 and through a suitable interface 44 coupling the computer 30 to the vibration system 13. The interface 44 also receives the actual response 21. Using computer executed program modules, discussed below as methods, computer 30 calculates a repeatable bandwidth or frequency range of the physical system. The calculated repeatable bandwidth is then used in the modeling and/or drive signal generation processes.

Referring now to FIG. 3, the present invention can be described in conjunction with known methods for modeling the physical system 10 and obtaining the drive 17 to be applied thereto. Although described below with respect to a test vehicle, it should be understood that these known methods and the present invention as illustrated in FIG. 3 are not confined to testing only vehicles, but can be used on other types of test specimens and substructures or components thereof. In addition the system model can take many forms including but not limited to linear and non-linear represented in frequency, time, state space or neural networks. Furthermore, the description is done assuming spectral analysis based modeling estimation and implementation though operations can be carried by several other mathematical techniques (e.g. Adaptive Inverse Control (AIC) type models, parametric regression techniques such as Auto Regressive Exogenous (ARX) and State Space types of models, or combinations thereof).

Referring to FIG. 3, at step 52, the test vehicle is instrumented with the remote transducers 20. At step 54, the vehicle is subjected to the field operating environment of interest and the remote transducer responses are measured and recorded. For instance, the vehicle can be driven on a road or test track. The measured remote transducer responses, typically analog, are stored in the computer 30 in a digital format through analog-to-digital converters, as is commonly known.

Next, in a system identification phase 55, the bandwidth and the input/output model of the physical system 10 are determined. At step 56, modeling drive ensembles are applied to physical system 10 to obtain responses from the physical system. At this point, it is helpful to provide definitions for terminology used to describe the present invention. It must be noted, however, that slightly different definitions for the following terminology can be used without departing from the scope of the present invention. For purposes of generating a model of the physical system, it is common to provide, on each channel, a "random" noise signal of a known duration sometimes referred to as a "frame". An exemplary duration for a frame is five seconds. The "random" noise signal is typically a combination of multiple periodic waveforms. An "ensemble" can be defined as a collection of individual channel signals over a frame or frames, i.e. a subset of a time history and potentially the whole time history. For purposes of describing the invention, the phrase "modeling drive ensemble" can be defined as an ensemble used for system identification. However, a definition of the term "ensemble" being equivalent to one or more frames of data for a single channel time history is also consistent with the present invention.

At step 56 illustrated in FIG. 3, drive ensembles are applied to physical system 10 to obtain a response. A method of applying the drive ensembles to the physical system in accordance with the first aspect of the present invention is discussed later with reference to FIGS. 5–7. With the exception of the method of applying the drive ensembles to the physical system in accordance with the first aspect of the present invention, step 56 of applying drive ensembles to the physical system to obtain the response of the physical system is similar to conventional methods of formulating a model of the physical system.

Using the drive ensembles and the responses obtained from the physical system in response to application of the drive ensembles, an estimate of the repeatable bandwidth of the physical system is calculated as illustrated generally at step 57. In accordance with the second aspect of the present invention, system controller 23 (FIG. 1) calculates the system repeatable bandwidth as a function of the difference between responses of physical system 10 to multiple replications of each drive ensemble. Due to characteristics of the physical system, different responses will be received during repeated applications of identical drive ensembles as appreciated by those skilled in the art. Adding additional replications of each drive ensemble, in accordance with the first aspect of the present invention, facilitates analysis of the system response to these ensembles to calculate an estimate the system repeatable bandwidth. This aspect of the present invention is described below in greater detail with reference to FIGS. 5–7.

At step 58, a system model of physical system 10 is calculated. The physical system model can be calculated using known procedures. These procedures can utilize the responses to the drive ensembles applied to the physical system 10 at step 56. In other embodiments, the system model and the system repeatable bandwidth may be derived from a separate and potentially different set of drive ensembles.

At step 58, an estimate of the model of the physical system 10 is calculated based on the input drive applied and the remote transducer response obtained. In one embodiment, this is commonly known as the "frequency response function" (FRF). Mathematically, the FRF is a N×M matrix wherein each element is a frequency dependent complex variable (gain and phase versus frequency). The columns of the matrix correspond to the inputs, while the rows correspond to the outputs. As appreciated by those skilled in the art, the FRF may also be obtained directly from prior tests using the physical system 10 or other systems substantially similar to the physical system 10.

An inverse of the system model $H(f)^{-1}$ is needed to determine the physical drive 17 as a function of the remote responses at step 60. As appreciated by those skilled in the art, the inverse model can be calculated directly from the input drive and remote transducer response. Also, the term "inverse" model as used herein includes a M×N "pseudo-inverse" model for a non-square N×M system. Techniques for iteratively or directly calculating the physical drive 17 to achieve a desired response of the physical system are well known in the art.

Step 56 of applying drive ensembles to physical system 10 can be implemented in accordance with a first aspect of the present invention discussed with reference to FIGS. 5–7. However, this aspect of the present invention may be best understood by first describing a prior art technique illustrated in FIG. 4. In FIG. 4, one channel 100 with a collection of drive ensembles is shown. Frames forming the collection of drive ensembles, having for example a length of five seconds each, are provided sequentially as drive 17 input to servo controller 14, and the responses 21 are recorded. Illustrated in FIG. 4 are first, second and third frames for channel 100. Typically each frame is made up of a combination of periodic waveforms having different frequencies. The combinations of periodic waveforms are repeatable in a subsequent frame. A typical method of measuring the FRF of physical system 10 is to generate an orthogonal drive where each frame (or ensemble for multiple channels) is replicated and the replicated frame is used for inter-frame smoothing. The FRF analysis is then applied to the replicated and unsmoothed frame using periodic boundary conditions. Although illustrated as one channel, those skilled in the art will realize that a frame can represent a collection of channels in a multi-channel system.

As described above, in the prior art, each frame of the channel 100 is repeated. As illustrated in FIG. 4, the first frame 110 is repeated in frame 115, the second frame 120 is repeated in frame 125, and the third frame 130 is repeated in frame 135. To avoid discontinuities in the contiguous drive signal, the first boundary and nearby portions of each new non-repeated frame are modified to allow a ramping up of the signal and of the response of physical system 10. Thus, as illustrated in FIG. 4, in frames 110, 120 and 130 respective boundaries 111, 121 and 131 and nearby regions of these frames are modified. At frames 115, 125 and 135, the first, second and third frames are respectively repeated-but in an unmodified form. Periodic boundary conditions which match frames 110 and 115 at boundary 112, frames 120 and 125 at boundary 122, and frames 130 and 135 at boundary 132, allow frames 115, 125 and 135 to remain pure or unmodified. Calculating the FRF of the physical system 10 using the relationship between the unmodified frames and the response 21 to those unmodified frames has been found to be more accurate than using modified frames.

FIGS. 5–7 illustrate an aspect of the present invention in which each frame (ensemble for multiple channels) is repeated in an unmodified form at least twice. The additional replications of each frame allows the system response between identical frames to be used to estimate the system repeatable bandwidth. In one embodiment illustrated in FIG. 5, each frame of channel 100 is repeated twice. Thus, following modified first frame 110 is unmodified versions of this frame in frames 115 and 117. Consistent with the above description, periodic boundary conditions between frames 110 and 115, and between frames 115 and 117, allow frames 115 and 117 to remain unmodified and continuous between adjacent frames. Similarly, following modified second frame 120 is unmodified versions of this frame in frames 125 and 127. Periodic boundary conditions between frames 120 and 125, and between frames 125 and 127, allow frames 125 and 127 to remain unmodified and continuous between adjacent frames.

FIG. 6 diagrammatically illustrates the drive signal of channel 100 in frames 110, 115 and 117. As can be seen in FIG. 6, the drive signal in frame 110 is modified near boundary 111 to allow a ramping up of the drive signal and of the system response. The periodic boundary conditions allow frames 115 and 117 to remain unmodified.

In a second embodiment illustrated in FIG. 7, each frame of the drive signal for channel 100 is repeated at least three times. Thus, following modified first frame 110 is unmodified versions of this frame in frames 115, 117 and 118. Periodic boundary conditions between frames 110 and 115, between frames 115 and 117, and between frames 117 and 118, allow frames 115, 117 and 118 to all remain unmodified. One purpose of this embodiment is to illustrate that the comparison of responses of physical system 10 to different replicants of a particular frame or ensemble need not occur between adjacent frames. For example, when estimating system repeatable bandwidth using the methods described below, the responses to unmodified frames 115 and 118 can be compared.

The invention is not restricted to embodiments in which responses to consecutive replicated frames are compared. Although illustrated wherein the identical frames comprise a single drive signal, multiple drive signals each containing one of the identical frames can also be used. The multiple drive signals can be provided to a single physical system at different times, or can be applied to two substantially identical physical systems. Reference to application of identical frames to a physical system is intended to cover all of the foregoing.

Using the methods described above of applying drive ensembles to physical system 10, system controller 23 estimates the repeatable bandwidth of the physical system. In some embodiments, an assumption is made that system non-repeatability is only a function of the response (i.e., the remote transducers). In these embodiments, controller 23 calculates a cross spectral density $CSD_1$ from the first unmodified frame or ensemble repeat and an additional cross spectral density $CSD_2$ from the second or a subsequent repeat. Cross spectral densities (CSDs) are cross-spectrum matrixes between the response signal 21 and the drive signal 17. By assuming that the system non-repeatability is only a function of the response, the variation $\Delta FRF$ of the FRF with respect to that repeatability may be calculated using the relationship shown in Equation 1.

$$\Delta FRF = \frac{(CSD_1 - CSD_2)}{DSD} \qquad \text{EQ. 1}$$

$\Delta FRF$ represents the lower limit of resolution of the FRF and is compared with the FRF which may be calculated as a function of the drive spectral density DSD, which is the auto-spectrum matrix of the drive signals, using the relationship shown in Equation 2.

$$FRF = \frac{(CSD_1 + CSD_2)}{2*DSD} \qquad \text{EQ. 2}$$

Any portion of the FRF that lies below $\Delta FRF$ indicates that the system has insufficient repeatability. Hence, the estimated repeatable bandwidth of the system should be limited to those regions where the FRF is above $\Delta FRF$. The comparison between FRF and $\Delta FRF$ can be implemented by controller 23 using the following mathematical processes.

The units scaling from FRF and $\Delta FRF$ are removed by factoring out the drive and response units using the relationships illustrated in Equations 3 and 4.

$$FRF = R*\hat{H}*D \qquad \text{EQ. 3}$$

$$\Delta FRF = R*\Delta\hat{H}*D \qquad \text{EQ. 4}$$

Matrices R and D are diagonal matrices containing the full scales of the drive and response channels, respectively. Matrices $\hat{H}$ and $\Delta\hat{H}$ are the unitless FRF and $\Delta FRF$ matrices. A singular value decomposition of $\hat{H}$ and $\Delta\hat{H}$ is performed using the relationships shown in Equations 5 and 6.

$$\hat{H} = U*S*V' \qquad \text{EQ. 5}$$

$$\Delta\hat{H} = \tilde{U}*\Delta S*\tilde{V} \qquad \text{EQ. 6}$$

Where U, $\tilde{U}$, V and $\tilde{V}$ are unitary matrices and S and S are scaling matrices that are diagonal and ordered.

FIG. 8 is a plot illustrating the first element 801 of the $\Delta S$ matrix in relation to elements 805 of the S matrix for a twelve input system. FIG. 9 illustrates the same, but includes, from the S matrix elements 805, only the S1 and S12 elements 815 and 820, respectively. Controller 23 compares the first element 801 of the $\Delta S$ matrix as a function of frequency with the elements 805 of the S matrix. Those elements 805 of the S matrix that fall below the first element 801 of the $\Delta S$ matrix are due to inputs that cannot be distinguished by the transducer set measuring overall system response and indicate the repeatable bandwidth limits of the system. As illustrated at reference number 810, element 820 of the S matrix is approximately equal to element 801 of the $\Delta S$ matrix at a frequency of approximately 38 Hz, indicating a set of channels of physical system 10 that will not be repeatably controllable beyond this frequency. If desired, the system repeatable bandwidth can be set so that the drive signals 17 on all input channels remain below this frequency. In the alternative, a new model can be constructed by eliminating the smallest diagonal(s) of the S matrix as a function of frequency, thereby eliminating the input frequencies only for the channels of the non-repeatable set.

In alternate methods of the present invention, an assumption is made that system repeatability is a function of only on drive inputs 17 to physical system 10. In these embodiments, the above-described methods are implemented with the variation that $\Delta FRF$ of the FRF is calculated using the relationship illustrated in Equation 7.

$$\Delta FRF = \frac{(\Delta RSD*CSD' - RSD*\Delta CSD')}{(CSD'*CSD')} \qquad \text{EQ. 7}$$

Where RSD and $\Delta$RSD are an average and a difference, respectively, of the response spectral densities $RSD_1$ and $RSD_2$ of the responses to the first and second ensemble repeats. CSD' and $\Delta$CSD' are an average and a difference, respectively, of the cross-spectral densities $CSD'_1$ and $CSD'_2$.

In accordance with some embodiments of the present invention, the FRF measurements are calculated with imbedded repeats one channel at a time. Also, in some embodiments of the present invention, additional repeats are added to the drive signals and the estimate of the system repeatability is calculated as an average of the differences between multiple repeated drive and response signals. In general, the various methods of the present invention can be implemented with all channels simultaneously, or one channel at a time.

In some embodiments, the environment during FRF measurement should be made as similar as possible to the environment of the system during laboratory iteration, i.e., in service conditions. This is because the largest contributions to system non-repeatability sometimes come from motions of the system itself as compared to an external source. For this reason, a differential measurement technique is used on a system that is undergoing representative multi-channel vibration. Use of this technique can establish repeatable bandwidth limits of the full system. It is possible to alter the model and extend the system repeatable bandwidth by eliminating those elements of the S matrix that fall below the elements of the ΔS matrix.

In the scope of this repeatability analysis it is often desirable to know specifically which physical system channels are associated with the offending non-repeatable set of channels as identified above. Per the singular value decomposition $\hat{H}=U*S*V'$, the system model H for physical system 10 is a relationship between drives 17, herein denoted as vector X, and responses 21 herein denoted as vector Y. Substituting and rearranging $$\hat{H}=U*S*V', Y=H*X$$

yields $$U'*Y=S*V'*X.$$

It has been discovered that matrix V' defines which of the physical channels X are associated with each singular value as function of frequency. Thus specific physical input channels of a particular set can be identified, potentially allowing remedial action of the input channel(s) to enhance the repeatable system bandwidth. For instance, with reference to FIG. 1, remedial action could include hardware fixes of the actuator(s) 15 or interfaces 16, corrections of problems with the servo controller 14, correction of electrical problems between the system controller 23 and the servo controller 14, to name a few.

When all input channels are determined to be working properly, the problem can be due to the response transducer configuration. In this case, the column of V associated with a small singular value defines a combination of input channels, possibly at a high amplitude, that is not detected by the response transducer set. In other words, all of the response transducers miss this state of vibration.

Knowing the input combination that produces this effect, can lead directly to a corrective modification of the response transducer set. In difficult cases, the physical system can be driven with such a combination of inputs to produce an observable level of vibration, but insignificant response from the transducers. The location of one or more significant response points might be determined by observation, greatly accelerating the process of adding or moving transducers to achieve an acceptable set.

Although, steps 56 and 57 can be performed during system identification 55, as described above, where the drive ensembles are designed to provide information required to calculate the system model. However, the drive ensembles can be those used during iterative phase 60 where the drive ensembles are calculated during the iterative process to reproduce the desired response. The drive ensembles from the iterative phase 60 would not include repeated sequences of modified and unmodified frames, but rather are the entire drive signal. As those skilled in the art would appreciate, the iteration drive ensembles may not include broad band frequency information that is inherent to the drive ensembles that are used for system modeling.

Although described above wherein an estimation of system repeatability to the differences in the responses to substantially identical drive ensembles was described using the singular value techniques presented, other techniques for inferring or estimating repeatable system bandwidth can be utilized in accordance with the invention. For example, these techniques include, but are not limited to, frequency domain analysis such as ΔFRF, ΔCSD, ΔRSD, and ΔS of the responses to the identical drive ensembles; statistical domain analysis such as ΔRMS (root mean square of the response time histories) of the responses to the identical drive ensembles; and time history domain analysis such as the difference between the responses to the identical drive ensembles.

Although the present invention has been described with reference to preferred embodiments, workers skilled in the art will recognize that changes may be made in form and detail without departing from the spirit and scope of the invention. For example, those of skill in the art will recognize that a slight modification to the "unmodified" drive ensembles will still result in the benefits of the invention. Further, the application of "identical" drive ensembles for use in calculating or estimating a repeatable system bandwidth can implemented with substantially or approximately identical drive ensembles in alternate embodiments. Further still, application of the identical drive ensembles to the physical system at different times can be implemented using any technique (e.g. in separate drive signals or in appended drive signals). Also, the various methods of the present invention can be implemented with all channels simultaneously, or one channel at a time.

What is claimed is:

1. A method of identifying characteristics of a physical system, the method comprising:
   applying first and second substantially identical drive ensembles to the physical system and obtaining corresponding responses from the physical system, wherein applying the first and second substantially identical drive ensembles to the physical system further comprises applying a modified drive ensemble to the physical system prior to applying the first and second substantially identical drive ensembles to the physical system, wherein the first and second substantially identical drive ensembles are substantially unmodified versions of the modified drive ensemble; and
   estimating a repeatable bandwidth of the physical system as a function of the applied first and second substantially identical drive ensembles and the corresponding obtained responses.

2. The method of claim 1, and further comprising calculating simulation drive inputs for the physical system as a function of the estimated repeatable bandwidth of the physical system in order to obtain a desired response from the physical system.

3. The method of claim 1, wherein estimating a repeatable bandwidth includes at least one of frequency domain analysis, statistical domain analysis and time history domain analysis of the responses to the substantially identical drive ensembles.

4. The method of claim 1, wherein applying the first and second substantially identical drive ensembles further comprises applying the second drive ensemble immediately after applying the first drive ensemble.

5. The method of claim 1, wherein applying the first and second substantially identical drive ensembles further comprises applying a third drive ensemble between the first and second substantially identical drive ensembles.

6. The method of claim 1, wherein applying the first and second substantially identical drive ensembles further comprises: applying a first drive signal having the first drive ensemble; and applying a second drive ensemble having the second drive ensemble.

7. A method of identifying characteristics of a physical system, the method comprising:

applying first and second substantially identical drive ensembles to the physical system and obtaining corresponding responses from the physical system; and estimating a repeatable bandwidth of the physical system as a function of the applied first and second substantially identical drive ensembles and the corresponding obtained responses, wherein estimating the repeatable bandwidth of the physical system further comprises:

calculating a first cross spectral density $CSD_1$ between the first drive ensemble and the corresponding response;

calculating a second cross spectral density $CSD_2$ between the second drive ensemble and the corresponding response; and calculating a variation $\Delta FRF$ of a frequency response function FRF for the physical system as a function of the first cross spectral density $CSD_1$ and the second cross spectral density $CSD_2$.

8. The method of claim 7, wherein the frequency response function FRF is calculated as a function of the first cross spectral density $CSD_1$, the second cross spectral density $CSD_2$, and of a drive spectral density DSD, using the relationship:

$$FRF = \frac{(CSD_1 + CSD_2)}{2*DSD}.$$

9. The method of claim 7, wherein calculating the variation $\Delta FRF$ of the frequency response function FRF for the physical system further comprises calculating the variation $\Delta FRF$ as a function of the first cross spectral density $CSD_1$, the second cross spectral density $CSD_2$, and a drive spectral density DSD using the relationship:

$$\Delta FRF = \frac{(CSD_1 - CSD_2)}{DSD}.$$

10. The method of claim 7, wherein calculating the variation $\Delta FRF$ of the frequency response function FRF for the physical system further comprises calculating the variation $\Delta FRF$ as a function of the first cross spectral density $CSD_1$, the second cross spectral density $CSD_2$, and a drive spectral density DSD using the relationship:

$$\Delta FRF = \frac{(\Delta RSD*CSD' - RSD*\Delta CSD')}{(CSD'*CSD')}$$

where RSD is an average of the response spectral densities $RSD_1$ and $RSD_2$ of the responses to the first and second substantially identical drive ensembles, wherein $\Delta RSD$ is a difference of the response spectral densities $RSD_1$ and $RSD_2$ of the responses to the first and second substantially identical drive ensembles, CSD' is an average of the cross-spectral densities $CSD'_1$ and $CSD'_2$ of the responses to the first and second substantially identical drive ensembles, and $\Delta CSD'$ is a difference of the cross-spectral densities $CSD'_1$ and $CSD'_2$ of the responses to the first and second substantially identical drive ensembles.

11. The method of claim 7, wherein estimating the repeatable bandwidth for the physical system further comprises comparing a singular value decomposition as a function of frequency of the variation $\Delta FRF$ to a singular value decomposition as a function of frequency of the frequency response function FRF.

12. The method of claim 11, and further comprising identifying inputs to the physical system to which the physical system is insensitive as a function of frequency using the relationship:

$$U'^{*}Y = S^{*}V'^{*}X$$

where H is a model of the physical system, X is a matrix of inputs of the physical system, Y is a matrix of responses of the physical system such that $Y = H^{*}X$ and $\hat{H} = U^{*}S^{*}V'$, and where U' and V' are rotational matrices, V' being indicative of the inputs to the physical system to which the physical system is insensitive.

13. A computer readable medium including instructions readable by a computer, which when implemented, cause the computer to identify characteristics of a physical system, the instructions performing steps comprising:

applying first and second substantially identical drive ensembles to the physical system and obtaining corresponding responses from the physical system, wherein the instructions performing step of applying the first and second substantially identical drive ensembles to the physical system further comprises applying a modified drive ensemble to the physical system prior to applying the first and second substantially identical drive ensembles to the physical system, wherein the first and second substantially identical drive ensembles are substantially unmodified versions of the modified drive ensemble; and estimating a repeatable bandwidth of the physical system as a function of the applied drive ensembles and the corresponding obtained responses.

14. The computer readable medium of claim 13, and further including instructions performing step comprising calculating simulation drive inputs for the physical system as a function of the estimated repeatable bandwidth of the physical system in order to obtain a desired response from the physical system.

15. The computer readable medium of claim 13, wherein the instructions performing step of estimating a repeatable bandwidth includes at least one of frequency domain analysis, statistical domain analysis and time history domain analysis of the responses to the substantially identical drive ensembles.

16. The computer readable medium of claim 13, wherein the instructions performing step of applying the first and second substantially identical drive ensembles further comprises applying the second drive ensemble immediately after applying the first drive ensemble.

17. The computer readable medium of claim 13, wherein the instructions performing step of applying the first and second substantially identical drive ensembles further comprises applying a third drive ensemble between the first and second substantially identical drive ensembles.

18. The computer readable medium of claim 13, wherein the instructions performing step of applying the first and second substantially identical drive ensembles further comprises:

applying a first drive signal having the first drive ensemble; and applying a second drive ensemble having the second drive ensemble.

19. A computer readable medium including instructions readable by a computer, which when implemented, cause the computer to identify characteristics of a physical system, the instructions performing steps comprising:

applying first and second substantially identical drive ensembles to the physical system and obtaining corresponding responses from the physical system; and estimating a repeatable bandwidth of the physical system as a function of the applied first and second drive ensembles and the corresponding obtained responses, wherein the instructions performing step of estimating the repeatable bandwidth of the physical system further comprises:

calculating a first cross spectral density $CSD_1$ between the first drive ensemble and the corresponding response;

calculating a second cross spectral density $CSD_2$ between the second drive ensemble and the corresponding response; and calculating a variation $\Delta FRF$ of a frequency response function FRF for the physical system as a function of the first cross spectral density $CSD_1$ and the second cross spectral density $CSD_2$.

20. The computer readable medium of claim 19, wherein the frequency response function FRF is calculated as a function of the first cross spectral density $CSD_1$, the second cross spectral density $CSD_2$, and of a drive spectral density DSD, using the relationship:

$$FRF = \frac{(CSD_1 + CSD_2)}{2*DSD}.$$

21. The computer readable medium of claim 19, wherein the step of calculating the variation $\Delta FRF$ of the frequency response function FRF for the physical system further comprises calculating the variation $\Delta FRF$ as a function of the first cross spectral density $CSD_1$, the second cross spectral density $CSD_2$, and a drive spectral density DSD using the relationship:

$$\Delta FRF = \frac{(CSD_1 - CSD_2)}{DSD}.$$

22. The computer readable medium of claim 19, wherein the step of calculating the variation $\Delta FRF$ of the frequency response function FRF for the physical system further comprises calculating the variation $\Delta FRF$ as a function of the first cross spectral density $CSD_1$, the second cross spectral density $CSD_2$, and a drive spectral density DSD using the relationship:

$$\Delta FRF = \frac{(\Delta RSD * CSD' - RSD * \Delta CSD')}{(CSD' * CSD')}$$

where RSD is an average of the response spectral densities $RSD_1$ and $RSD_2$ of the responses to the first and second substantially identical drive ensembles, wherein $\Delta RSD$ is a difference of the response spectral densities $RSD_1$ and $RSD_2$ of the responses to the first and second substantially identical drive ensembles, CSD' is an average of the cross-spectral densities $CSD'_1$ and $CSD'_2$ of the responses to the first and second substantially identical drive ensembles, and $\Delta CSD'$ is a difference of the cross-spectral densities $CSD'_1$ and $CSD'_2$ of the responses to the first and second substantially identical drive ensembles.

23. The computer readable medium of claim 19, wherein the step of estimating the repeatable bandwidth for the physical system further comprises comparing a singular value decomposition as a function of frequency of the variation $\Delta FRF$ to a singular value decomposition as a function of frequency of the frequency response function FRF.

24. The computer readable medium of claim 23, and further comprising an instructions performing step of identifying inputs to the physical system to which the physical system is insensitive as a function of frequency using the relationship:

$$U'^*Y=S*V'^*X$$

where H is a model of the physical system, X is a matrix of inputs of the physical system, Y is a matrix of responses of the physical system such that Y=H*X and Ĥ=U*S*V', and where U' and V' are rotational matrices, V' being indicative of the inputs to the physical system to which the physical system is insensitive.

* * * * *